(12) United States Patent
Koyama et al.

(10) Patent No.: US 9,733,447 B2
(45) Date of Patent: Aug. 15, 2017

(54) IMAGING MODULE AND MANUFACTURING METHOD THEREFOR

(71) Applicant: SHARP KABUSHIKI KAISHA, Osaka-shi, Osaka (JP)

(72) Inventors: Eiji Koyama, Osaka (JP); Katsuhisa Sutoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/037,505

(22) PCT Filed: Oct. 23, 2014

(86) PCT No.: PCT/JP2014/078215
§ 371 (c)(1),
(2) Date: May 18, 2016

(87) PCT Pub. No.: WO2015/076056
PCT Pub. Date: May 28, 2015

(65) Prior Publication Data
US 2016/0282580 A1    Sep. 29, 2016

(30) Foreign Application Priority Data

Nov. 20, 2013 (JP) ................................. 2013-240378

(51) Int. Cl.
*G02B 7/08* (2006.01)
*H04N 5/225* (2006.01)
(Continued)

(52) U.S. Cl.
CPC ............... *G02B 7/08* (2013.01); *G02B 7/021* (2013.01); *H04N 5/2253* (2013.01);
(Continued)

(58) Field of Classification Search
CPC ........ G02B 7/08; G02B 7/021; H04N 5/2253; H04N 5/2254; H04N 5/2257; H04N 5/23212
See application file for complete search history.

(56) References Cited

U.S. PATENT DOCUMENTS 9,055,207 B2 *   6/2015   McKinley ............ H04N 5/2253
9,285,654 B2 *   3/2016   Lipson ..................... G03B 3/10
(Continued)

FOREIGN PATENT DOCUMENTS

JP      2007-104288      4/2007
JP      2009-98462       5/2009
(Continued)

OTHER PUBLICATIONS

English translation of JP 2013-200459 A, Hanabusha Nobutaka, Oct. 3, 2013.*

(Continued)

*Primary Examiner* — James Hannett
(74) *Attorney, Agent, or Firm* — Nixon & Vanderhye P.C.

(57) ABSTRACT

An imaging module (camera module 50) includes a movable portion (holder 4 and coil 5) which fixes a first lens group (1) and is displaced in an optical axis direction thereof, and a non-movable portion (magnet 6, yoke 7, and base 8) which fixes a second lens group (2) and is not displaced in the optical axis direction, and includes a focus adjustment mechanism (actuator 20A) fixed to the substrate.

5 Claims, 9 Drawing Sheets

(51) Int. Cl.
  *G02B 7/02* (2006.01)
  *H04N 5/232* (2006.01)
(52) U.S. Cl.
  CPC ......... *H04N 5/2254* (2013.01); *H04N 5/2257* (2013.01); *H04N 5/23212* (2013.01)

(56) References Cited

U.S. PATENT DOCUMENTS

| | | | | |
|---|---|---|---|---|
| 2007/0047938 A1* | 3/2007 | Suzuki | ................... | G02B 7/023 |
| | | | | 396/89 |
| 2009/0160998 A1* | 6/2009 | Fukamachi | ............ | G02B 7/021 |
| | | | | 348/340 |
| 2012/0075721 A1* | 3/2012 | Konishi | ............... | G02B 13/003 |
| | | | | 359/708 |

FOREIGN PATENT DOCUMENTS

| | | |
|---|---|---|
| JP | 2009-116176 | 5/2009 |
| JP | 2009-147898 | 7/2009 |
| JP | 2013-200459 | 10/2013 |
| KR | 2010-0080886 | 7/2010 |
| KR | 2011-0110581 | 10/2011 |
| WO | WO 2010/143459 | 12/2010 |

OTHER PUBLICATIONS

International Search Report for PCT/JP2014/078215, mailed Dec. 9, 2014, 4 pages.

* cited by examiner

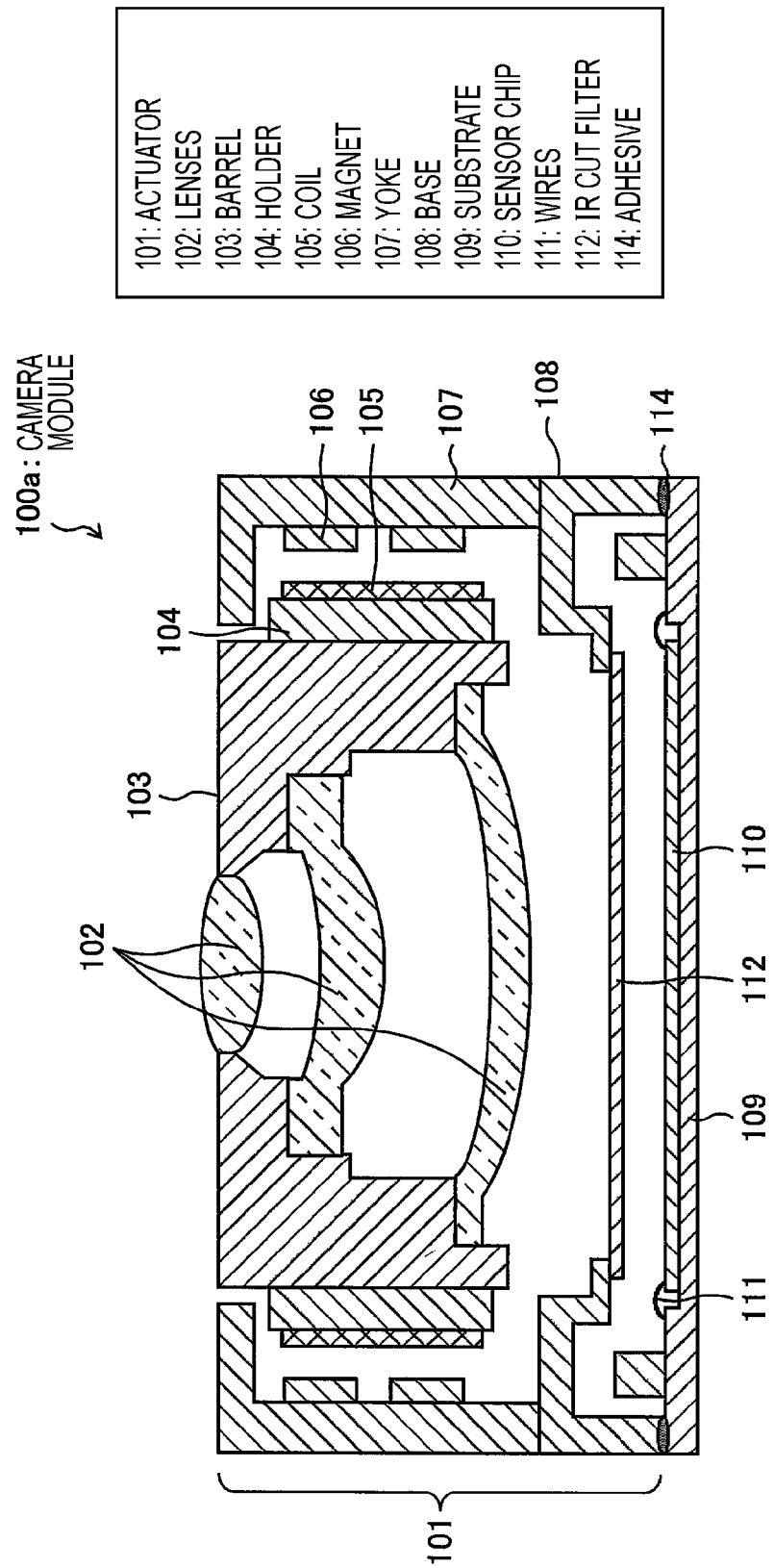

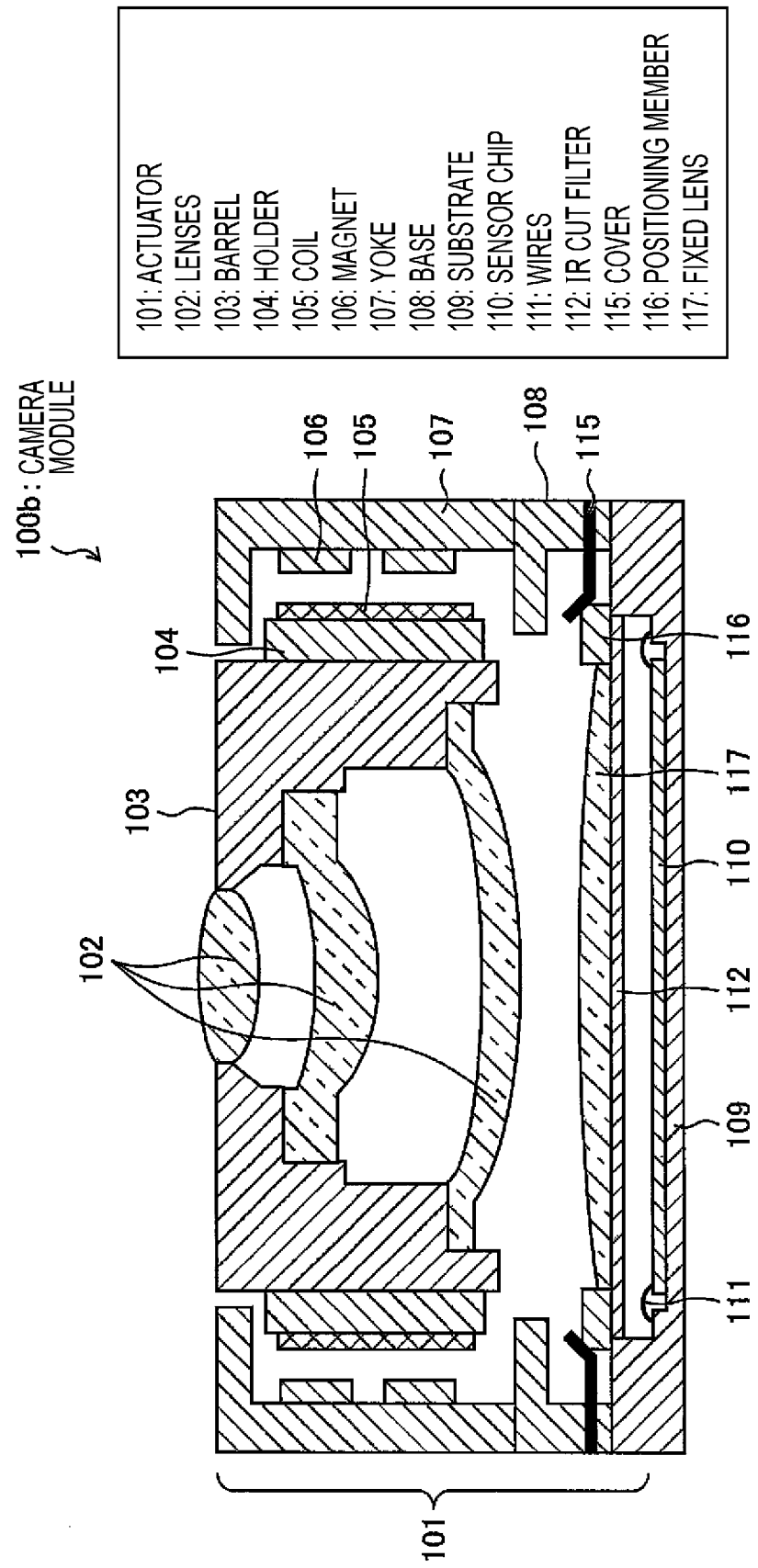

IMAGING MODULE AND MANUFACTURING METHOD THEREFOR

This application is the U.S. national phase of International Application No. PCT/JP2014/078215 filed 23 Oct. 2014, which designated the U.S. and claims priority to JP Patent Application No. 2013-240378 filed 20 Nov. 2013, the entire contents of each of which are hereby incorporated by reference.

TECHNICAL FIELD

The present invention relates to an imaging module capable of positioning lenses and an imaging sensor accurately, and a manufacturing method therefor.

BACKGROUND ART

In recent years, a small-sized imaging module has been mainly used for camera-equipped mobile device such as a mobile phone or mobile terminal (PDA). In such an imaging module, an imaging sensor having a plurality of light receiving elements for performing photoelectric conversion of incident light from an object is modularized (integrated) with a lens for focusing the incident light on the imaging sensor.

The small-sized imaging module includes a sensor chip (solid-state imaging chip) arranged on a substrate that is mainly made of ceramic, glass-impregnated epoxy resin, or the like. The imaging sensor having the plurality of light receiving elements arranged in a two-dimensional array is disposed on the center part of the sensor chip.

The small-sized imaging module also includes an actuator. The actuator vertically moves a holder, in which a lens for focusing the incident light on the imaging sensor is fixed, in the small-sized imaging module. Here, a camera module 100a is illustrated in FIG. 8 as an example of the small-sized imaging module.

The camera module 100a has a sensor chip 110 attached on a substrate 109 with an adhesive (not illustrated). A plurality of pads (not illustrated) are provided on an outer peripheral portion of the sensor chip 110 and the pads are wire-bonded with respective terminals (not illustrated) on the substrate 109 with wires 111 for electrical connection.

The camera module 100a further includes an actuator 101. The actuator 101 includes a holder 104, a coil 105 wounded on an outer periphery of the holder 104, a yoke 107, a magnet 106, and a base 108 fixed to the substrate 109. The yoke 107 is a metal member and electrically shields the camera module 100a, which is provided on an outer periphery of the coil 105, from its outside. The magnet 106 is arranged on the inner side of the yoke 107 at a predetermined gap with the coil 5.

A barrel 103 is fixed with an adhesive (not illustrated) in the inside of the holder 104. Lenses 102 are surrounded by the barrel 103 and the lenses 102 are held inside the barrel 103.

When current flows through the coil 105 in the actuator 101 configured as described above, electromagnetic force is generated between the coil 105 and the magnet 106. With the electromagnetic force, the holder 104 is displaced in an optical axis direction of the lenses 102 together with the lenses 102 and the barrel 103. An amount of the displacement is controlled with an amount of the current flowing through the coil 105.

The aforementioned structure of the actuator 101 is a general VCM (Voice Coil Motor) structure.

In manufacturing of the camera module 100a, when the base 108 is fixed to the substrate 109 with an adhesive 114, the actuator 101 is fixed to the substrate 109. At this time, an IR cut filter 112 is inserted and fixed between the sensor chip 110 and the lenses 102. By this IR cut filter 112, entrance of infrared light to the sensor chip 110 is eliminated.

In the process described above, the actuator 101 needs to be fixed to the substrate 109 so that an image is formed accurately on an imaging surface of the sensor chip 110. When a relative positional shift is caused between the lenses 102 and the imaging surface of the sensor chip 110 or the optical axis is tilted, however, there is a problem of causing shading or partial blur resulting from a positional shift of a light flux, which comes through the lenses 102, in the imaging surface.

In particular, due to usage of the adhesive 114 for fixing the actuator 101 to the substrate 109, the base 108 may move while the adhesive 114 is being cured (for example, high temperature storage) in some cases, so that a relative positional shift, a tilt, or the like is easily caused.

Further, in the case of the VCM, there is also a problem of easily causing partial blur due to occurrence of a moving tilt or the like because the holder 104 is fixed to the yoke 107 and the base 108 with relatively weak force by a spring (not illustrated) or the like.

In order to solve the aforementioned problems, PTL 1 and PTL 2 describe a camera module and a solid-state imaging device, respectively, in which a lens is further provided over an imaging sensor and positioning of the imaging sensor and the lens is performed accurately with a positioning mechanism provided around the lens.

In detail, PTL 2 describes the solid-state imaging device which includes a barrel for holding a first lens, a driving mechanism for adjusting a position of the first lens in an optical axis direction of the first lens, and a structure which abuts the barrel so that the first lens faces a solid-state imaging sensor, in which the first lens is held by the barrel, and a second lens is provided in an inner peripheral portion of the structure. In this solid-state imaging device, the barrel abuts against a tilt portion provided in the structure and is thereby fixed thereto, so that it is possible to determine a positional relation between the first lens and the second lens and further a positional relation between the position of the first lens and the center of the solid-state imaging sensor.

The camera module described in PTL 1 will be described with reference to FIG. 9. Note that, for convenience of the description, the same reference signs will be assigned to the members having the same functions as the members described in FIG. 8, and the description thereof will be omitted.

As illustrated in FIG. 9, in a camera module 100b, a fixed lens 117 is provided over the substrate 109 and is arranged between the lenses 102 and the sensor chip 110 (imaging sensor). A positioning member 116 abutting the actuator 101 is formed in an outer peripheral portion of the fixed lens 117. A cover 115 formed in a shape covering almost lower surfaces of the holder 104, the coil 105, and the magnet 106 is also included.

The lenses described in PTL 1 and PTL 2 also function to correct distortion aberration or incident light.

CITATION LIST

Patent Literature

PTL 1: Japanese Unexamined Patent Application Publication No. 2009-116176 (Publication date: May 28, 2009)

PTL 2: Japanese Unexamined Patent Application Publication No. 2009-98462 (Publication date: May 7, 2009)

SUMMARY OF INVENTION

Technical Problem

In the camera module 100b illustrated in FIG. 9, by positioning the actuator 101 using the positioning member 116, a relative positional shift between the fixed lens 117 and the lenses 102 and a tilt of the optical axis are corrected. However, there remains production variation in relative positional shift and in the tilt of the optical axis between the fixed lens 117 fixed to the substrate and the sensor chip 110 (imaging sensor).

In the solid-state imaging device described in PTL 2, by abutting the barrel against the structure, a relative positional shift between the first lens and the second lens and a tilt of the optical axis are corrected. However, there remains production variation in relative positional shift and in the tilt of the optical axis between the second lens (fixed lens) and the solid-state imaging device.

Recently, active alignment has been adopted as a manufacturing method by which the production variation in the relative positional shift between the lens and the imaging sensor, and the tilt of the optical axis are modified. The active alignment is a method for determining an optimum position of the actuator on the substrate while performing fine adjustment of the position by using an optical or electric image to be formed as a feedback amount.

However, even when adopting the configuration of the camera module and the solid-state imaging device described in PTL 1 and PTL 2, it is difficult to generate a satisfactory electric image only by using the lens to be fixed to the substrate and the imaging sensor. Thus, an image to be subjected to feedback is not obtained and it is difficult to perform the active alignment. Accordingly, there is a problem in that the production variation in the relative positional shift between the fixed lens and the imaging sensor and the production variation in the tilt of the optical axis are not corrected.

The invention has been made in order to solve the aforementioned problems, and an object thereof is to provide an imaging module capable of positioning a lens and an imaging sensor accurately.

Solution to Problem

In order to solve the aforementioned problems, an imaging module according to one aspect of the invention is an imaging module including a substrate on which an imaging sensor is mounted; a plurality of lenses for imaging light from an object on the imaging sensor; and a focus adjustment mechanism which adjusts focus of the plurality of lenses and is fixed to the substrate, in which the focus adjustment mechanism includes a movable portion which is displaced in an optical axis direction of the plurality of lenses and a non-movable portion which is not displaced in the optical axis direction, a first lens group formed of two or more lenses selected from the plurality of lenses is fixed to an inner peripheral wall of the movable portion, and a second lens group formed of one or more lenses not included in the first lens group and selected from the plurality of lenses is fixed to an inner peripheral wall of the non-movable portion.

Advantageous Effects of Invention

According to one aspect of the invention, it is possible to realize an effect of providing an imaging module (camera module) capable of positioning lenses and an imaging sensor accurately.

BRIEF DESCRIPTION OF DRAWINGS

FIG. 8 is a vertical sectional view illustrating a configuration example of a main part of a conventional camera module.

FIG. 9 is a vertical sectional view illustrating a configuration example of a main part of another conventional camera module.

DESCRIPTION OF EMBODIMENTS

[Embodiment 1]

A camera module 50 (imaging module) according to Embodiment 1 of the invention will be described below based on FIG. 1 to FIG. 4.

(Configuration of Camera Module 50)

Figure 1:
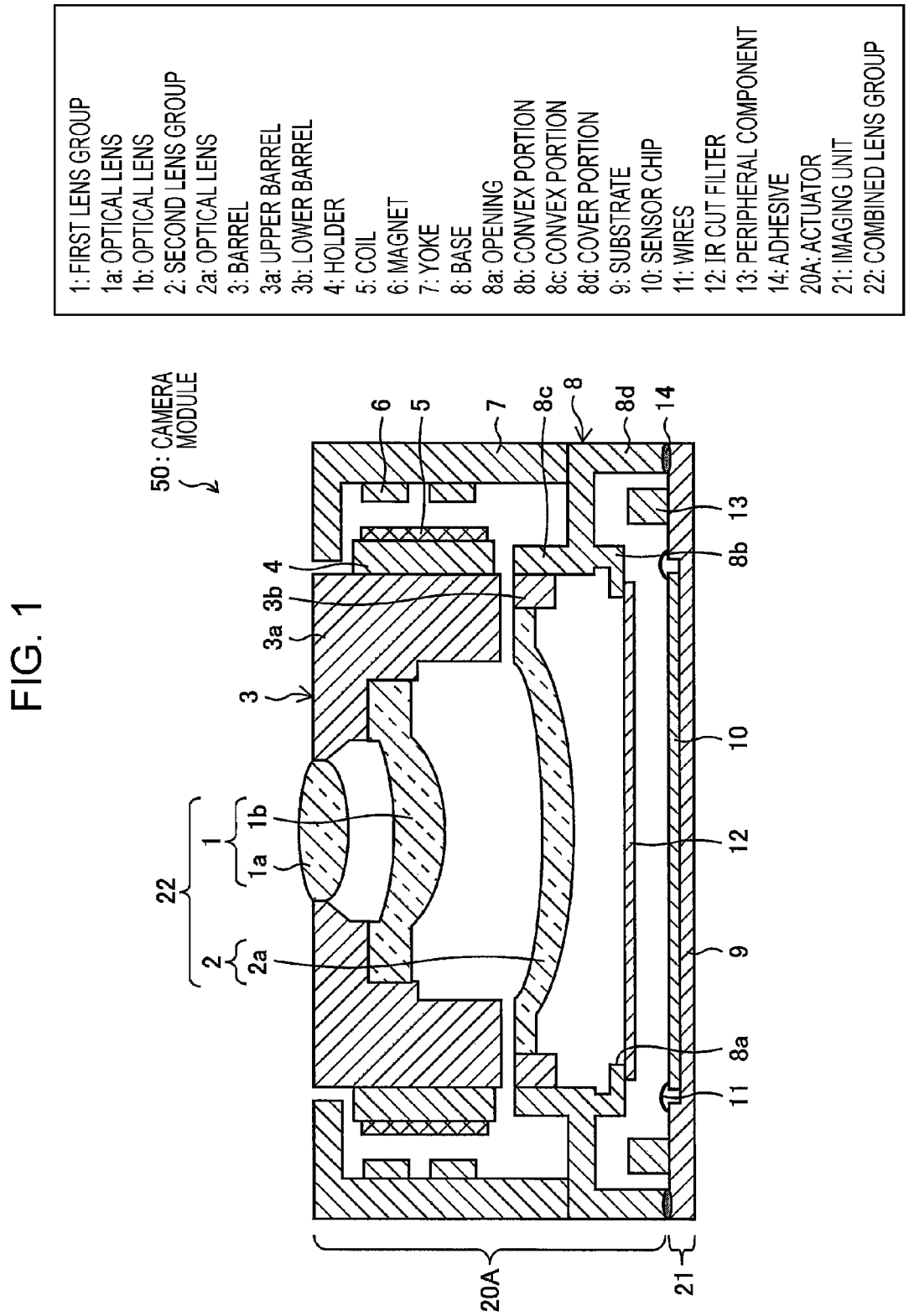
FIG. 1 is a vertical sectional view illustrating a configuration example of a main part of a camera module according to Embodiment 1 of the invention.

FIG. 1 is a vertical sectional view illustrating a configuration example of a main part of the camera module 50. The camera module 50 is a small-sized imaging module with an auto focus (AF) function for performing an operation of displacing a position of an optical lens in an optical axis direction to focus an image on an imaging surface (focusing) when an object is at an infinite distance or at a very close macro position.

As illustrated in FIG. 1, the camera module 50 includes a first lens group 1, a second lens group 2, a barrel 3, an actuator 20A (focus adjustment mechanism), and an imaging unit 21. The actuator 20A and the imaging unit 21 are overlaid in optical axis directions of the first lens group 1 and the second lens group 2. Each component will be described in detail below.

Note that, for convenience, description will be given below by assuming that the first lens group side (object side) is the upper side and the imaging unit 21 side is the lower side, but this does not prescribe upper and lower directions when using and the upper side and the lower side may be reversed, for example.

The first lens group 1 includes a plurality of lenses of an optical lens 1*a* (lens) and an optical lens 1*b* (lens) whose optical axes are matched, and guides light from outside to the second lens group 2. The first lens group 1 is fixed to an upper barrel 3*a* described below.

The second lens group 2 includes at least one optical lens 2*a* (lens) whose optical axis is matched with that of the first lens group 1, and guides light from the first lens group 1 to a sensor chip 10 (imaging sensor) of the imaging unit 21. The second lens group 2 is arranged between the first lens group 1 and the imaging unit 21. The second lens group 2 is fixed to a lower barrel 3*b* described below. Here, a lens group in which the first lens group 1 and the second lens group 2 are combined is referred to as a combined lens group 22.

The barrel 3 includes the upper barrel 3*a* and the lower barrel 3*b* to hold the first lens group 1 and the second lens group 2. Axial cores of the upper barrel 3*a* and the lower barrel 3*b* are respectively matched with the optical axes of the first lens group 1 and the second lens group 2.

The upper barrel 3*a* holds the first lens group 1 by a cavity portion thereof. The upper barrel 3*a* is fixed to an inner peripheral wall of a holder 4 described below that is a part of the actuator 20A.

The lower barrel 3*b* is arranged between the upper barrel 3*a* and the imaging unit 21, and holds the second lens group 2 by an inner peripheral wall thereof. The lower barrel 3*b* is fixed to a base 8 described below that is a part of the actuator 20A.

(Actuator 20A)

The actuator 20A is a device for displacing the first lens group 1 in the optical axis direction during focusing.

Specifically, the actuator 20A includes the holder 4, a coil 5, a magnet 6, a yoke 7, and the base 8.

The holder 4 is a ring member and holds the upper barrel 3*a* by the inner peripheral wall thereof. The holder 4 is held so as to be able to be displaced in the optical axis direction with respect to the yoke 7 and the base 8 described below. A method for supporting the holder 4 is not particularly limited. For example, by using springs configured so that a spring constant in a direction vertical to the optical axis is significantly great in comparison with a spring constant in the optical axis direction, an upper end (end on the object side) of the holder 4 may be fixed to the yoke 7 by one of the aforementioned springs and a lower end (end on the imaging unit 21 side) of the holder 4 may be fixed to the base 8 by another one of the aforementioned springs.

The yoke 7 is made of, for example, a metal member and is formed in a shape surrounding the holder 4. The yoke 7 electrically shields the camera module 50 from its outside. The magnet 6 is fixed to an inner peripheral wall of the yoke.

The coil 5 is wounded on an outer peripheral wall of the holder 4 to be fixed.

The magnet 6 is fixed to the inner peripheral wall of the yoke 7 at a predetermined gap with the coil 5.

When current flows through the coil 5, electromagnetic force is generated between the coil 5 and the magnet 6. When the electromagnetic force acts on the holder 4, the holder 4 is displaced in the optical axis direction together with the upper barrel 3*a* and the first lens group 1. That is, by flowing the current through the coil 5, the first lens group 1 is able to be displaced in the optical axis direction.

The base 8 is a member positioned under the yoke 7 and is connected to the yoke 7. The base 8 is placed so as to cover an outer peripheral portion of the substrate 9. In addition, the base 8 has a convex portion 8*b* projecting downward in an inner peripheral portion on the lower side surface and has a convex portion 8*c* projecting upward in an inner peripheral portion on the upper side surface. The convex portion 8*b* has an opening 8*a* penetrating in a vertical direction on the imaging surface side of the sensor chip 10.

The convex portion 8*c* is formed in a ring shape and has an inner peripheral wall to which the lower barrel 3*b* is fixed. Thereby, the second lens group 2 is fixed to the base 8.

The base 8 has a cover portion 8*d* projecting downward in an outer peripheral portion on the lower side surface. The lower end surface of the cover portion 8*d* is fixed to the substrate 9 with an adhesive 14. Thereby, the base 8 is fixed to the substrate 9 and the actuator 20A is fixed to the substrate 9.

As described above, the actuator 20A is a device for displacing the first lens group 1 in the optical axis direction during focusing. However, only the holder 4 and the coil 5 are displaced during focusing, and the magnet 6, the yoke 7, and the base 8 are not displaced during focusing. That is, the holder 4 and the coil 5 function as a focus movable portion (movable portion) which is displaced during focusing, and the magnet 6, the yoke 7, and the base 8 function as a focus fixed portion (non-movable portion) which is not displaced during focusing. Accordingly, the first lens group 1 fixed to the focus movable portion is displaced in the optical axis direction during focusing, and the second lens group 2 fixed to the focus fixed portion is not displaced during focusing.

Note that, the camera module 50 does not include a fixed lens as illustrated in FIG. 9 that is fixed to the substrate.

(Imaging Unit 21)

The imaging unit 21 includes the substrate 9, the sensor chip 10 (imaging sensor), an IR cut filter 12, and a peripheral component 13.

The IR cut filter 12 is provided in the base 8 so as to close the opening 8*a* and eliminates entrance of infrared light to the sensor chip 10.

The sensor chip 10 is mounted on the substrate 9 with an adhesive (not illustrated), receives light which has reached through the first lens group 1 and the second lens group 2 to perform photoelectric conversion, and obtains an object image formed on the sensor chip 10. An axial core of the sensor chip 10 is matched with the optical axes of the first lens group 1 and the second lens group 2.

A plurality of pads (not illustrated) are provided on an outer peripheral portion of the sensor chip 10 and the pads are wire-bonded by using wires 11 with respective terminals (not illustrated) of the substrate 9 for electrical connection. In addition, the peripheral component 13 is attached as appropriate to the substrate 9.

An upper surface of the substrate 9 and a lower end surface of the cover portion 8*d* of the base 8 are fixed with the adhesive 14.

(Focusing of Camera Module 50)

The camera module 50 includes the first lens group 1 and the second lens group 2 as described above. The first lens group 1 is fixed to the focus movable portion and the second lens group 2 is fixed to the focus fixed portion. Thus, the camera module 50 is able to achieve a small extension amount (stroke) during focusing. The description thereof will be given in detail below based on FIG. 2 and FIG. 3.

Figure 2:
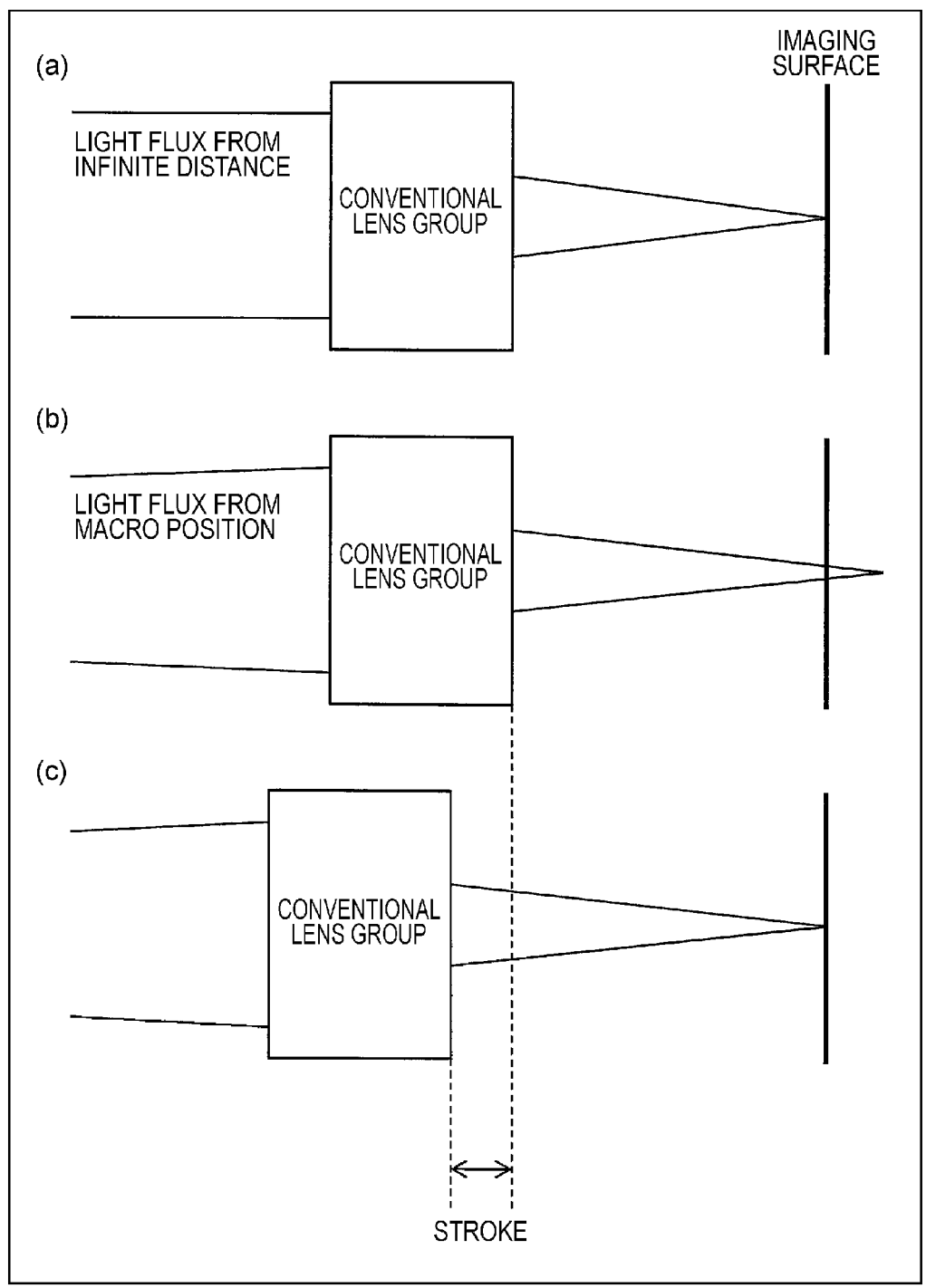
FIG. 2 is a view for explaining focusing in a conventional camera module, in which (a) illustrates a state where an image obtained when an object is at an infinite distance is formed on an imaging surface, (b) illustrates a state where an image obtained when the object is at a macro position is formed behind the imaging surface, and (c) illustrates a state where the image formed behind the imaging surface is formed again on the imaging surface.

FIG. 2 is a view for explaining focusing in a conventional camera module 100a. FIG. 2(a) illustrates a state where an image obtained when an object is at an infinite distance is formed on an imaging surface, FIG. 2(b) illustrates a state where an image obtained when the object is at a macro position is formed behind the imaging surface, and FIG. 2(c) illustrates a state where the image formed behind the imaging surface as illustrated in FIG. 2(b) is formed again on the imaging surface. In the conventional camera module 100a, a plurality of lenses 102 are all fixed to a holder 104 (refer to FIG. 8), and the plurality of lenses 102 are integrally displaced during focusing.

First, as illustrated in FIG. 2(a), the image obtained when the object is at the infinite distance is formed on the imaging surface. After this state, when the object is then at the macro position, the image formation position moves to be behind the imaging surface as illustrated in FIG. 2(b) so that the image becomes blur. In order to form it again on the imaging surface, by flowing current through the coil 105 fixed to the outer periphery of the holder 104 in the actuator 101, electromagnetic force is generated between the coil 105 and the magnet 106. With the generated electromagnetic force, the actuator 101 displaces the barrel 103 and the holder 104 which fix the plurality of lenses 102 so that the plurality of lenses 102 are extended to a side away from the imaging surface in the optical axis direction. The extension amount (between the infinite distance and the macro) is called a stroke.

Figure 3:
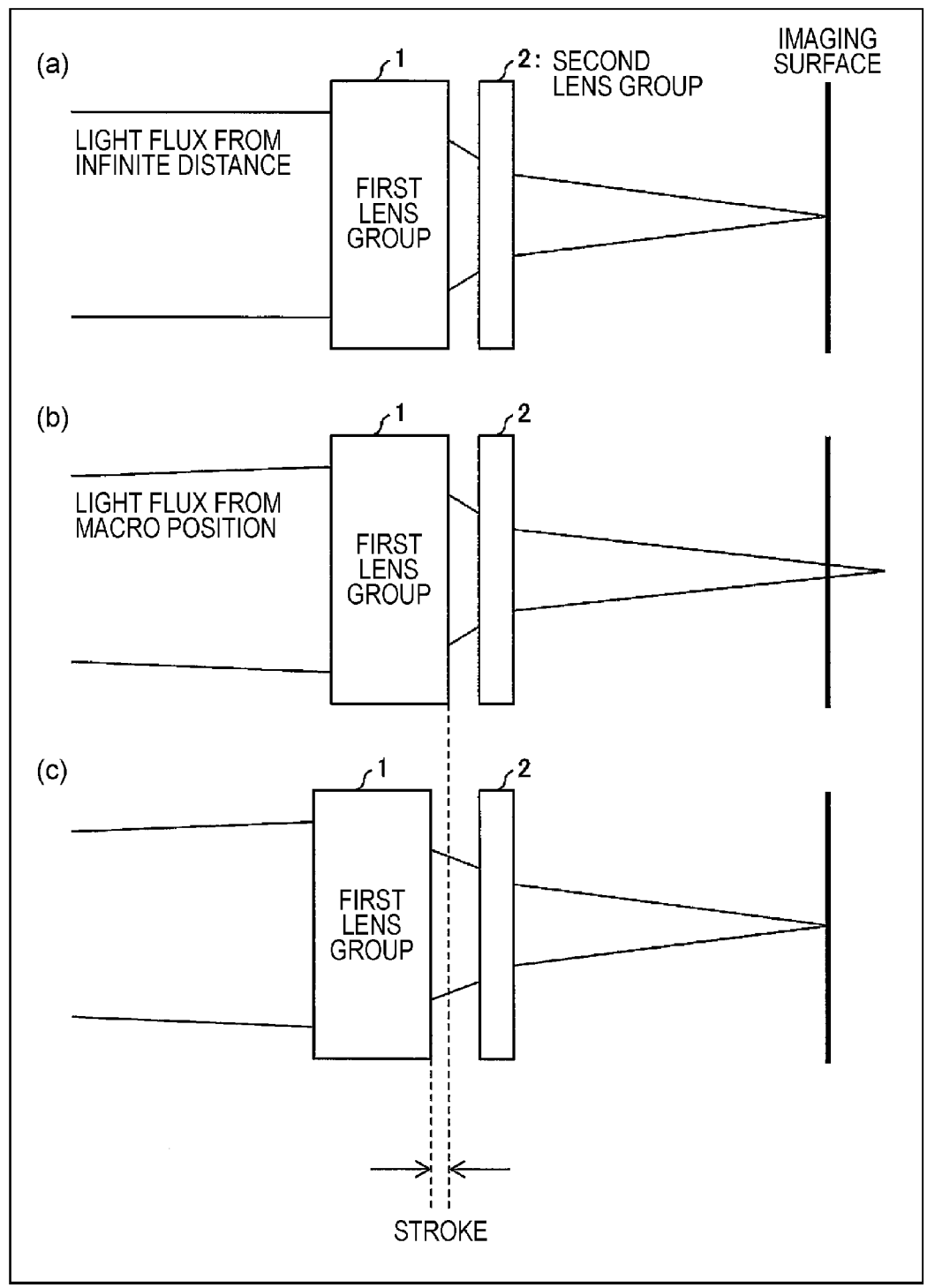
FIG. 3 is a view for explaining focusing in the camera module according to Embodiment 1 of the invention, in which (a) illustrates a state where an image obtained when an object is at an infinite distance is formed on an imaging surface, (b) illustrates a state where an image obtained when the object is at a macro position is formed behind the imaging surface, and (c) illustrates a state where the image formed behind the imaging surface is formed again on the imaging surface.

FIG. 3 is a view for explaining focusing in the camera module 50 according to the present embodiment. FIG. 3(a) illustrates a state where an image obtained when an object is at an infinite distance is formed on an imaging surface, FIG. 3(b) illustrates a state where an image obtained when the object is at a macro position is formed behind the imaging surface, and FIG. 3(c) illustrates a state where the image formed behind the imaging surface as illustrated in FIG. 3(b) is formed again on the imaging surface.

First, as illustrated in FIG. 3(a), the image obtained when the object is at the infinite distance is formed on the imaging surface. After this state, when the object is then at the macro position, the image formation position moves to be behind the imaging surface as illustrated in FIG. 3(b) so that the image becomes blur. In order to form it again on the imaging surface, by flowing current through the coil 5 fixed to the outer periphery of the holder 4 in the actuator 20A, electromagnetic force is generated between the coil 5 and the magnet 6. With the generated electromagnetic force, the actuator 20A displaces the upper barrel 3a and the holder 4 which fix the first lens group 1 so that the first lens group 1 is extended to a side away from the imaging surface in the optical axis direction. At this time, the lens group extended to the side away from the imaging surface in the optical axis direction is only the first lens group 1, and the second lens group 2 is fixed to the focus fixed portion and thus not displaced.

Here, in the present embodiment, optical lenses forming the first lens group 1 and the second lens group 2 are designed so that, as illustrated in FIG. 3(a), an angle of light travelling toward the second lens group 2 from the first lens group 1 (light incident on the second lens group 2 from the first lens group 1) with respect to optical axes of the optical lenses 1a, 1b, and 2a becomes steeper (greater) than an angle of light travelling toward the imaging surface from the second lens group 2 (light output from the second lens group to the sensor chip 10) with respect to the optical axes.

Accordingly, the comparison between FIG. 2(c) and FIG. 3(c) shows that the stroke amount of the camera module 50 according to Embodiment 1 is smaller than the stroke amount of the conventional camera module 100a during focusing. Specifically, for example, the stroke amount needed for a 1/1.33-optical-inch group is 400 μm in the conventional camera module, whereas it may be 250 μm in the camera module 50.

That is, compared to the conventional camera module 100a, the camera module 50 is able to perform efficient focusing and form an image obtained from an object on an imaging surface with the small stroke amount.

With the aforementioned configuration, the stroke amount needed during focusing is small and only the first lens group 1 is displaced during focusing in the camera module 50. Thus, a displacement amount of the focus movable portion during focusing is small and weight is reduced. As a result, a moving tilt occurring in the actuator 20A is suppressed and deterioration in image quality, such as partial blur, is improved.

Further, since the stroke amount needed during focusing is small in the camera module 50, relatively excellent image quality of the image obtained in the case of the macro position is maintained.

Specifically, the first lens group 1 and the second lens group 2 of the camera module 50 are designed so that an image with optimum image quality is able to be obtained when an object is at an infinite distance. Thus, in the case of the macro position in which the first lens group 1 is moved by the stroke amount, optimum image quality of the obtained image is not achieved inevitably. However, since the stroke amount needed during focusing is small in the camera module 50 according to Embodiment 1, a shift between the image quality of the obtained image and the optimum image quality is reduced even in the case of the macro position. Thus, relatively excellent image quality of the optimally obtained image in the case of the macro position is maintained.

Since the stroke amount needed during focusing is small in the camera module 50, height of the camera module 50 is able to be reduced by the reduced stroke amount.

Further, weight of the focus movable portion is reduced in the camera module 50. Accordingly, allowance is provided to the design of the actuator 20A, thus making it possible to achieve reduction in a size of the actuator 20A, and reduction in a size of the camera module 50.

In addition, in the camera module 50, the stroke amount needed during focusing is small and weight of the focus movable portion is reduced. This makes it possible to reduce power consumption during focusing.

Further, the second lens group 2 is arranged between the first lens group 1 and the IR cut filter 12 and is fixed to the base 8 with the lower barrel 3b. Therefore, it is possible to prevent occurrence of blot failure due to a foreign matter caused by strong shock or the like.

Specifically, for example, in the conventional camera module 100a illustrated in FIG. 8, the holder 104 fixing the lenses 102 is fixed to the yoke 107 and the base 108, for example, by a spring or the like. Thus, upon reception of strong shock or the like, the holder 104 is bumped against a peripheral member easily, and a foreign matter is generated when the holder 104 rubs against the peripheral member. Since there is no obstruction at this time, the foreign matter may fall down to the surface of the IR cut filter 112 positioned above the sensor chip 110. Since the sensor chip 110 and the IR cut filter 112 are at a close distance, the foreign matter is imaged on the sensor chip 110, resulting that an electrically blotted image is caused.

On the other hand, the second lens group 2 is arranged between the first lens group 1 and the IR cut filter 12 in the camera module 50. Thus, the foreign matter falls down on the second lens group 2. Since the second lens group 2 is positioned away from the sensor chip 10, the foreign matter is not imaged on the sensor chip 10. Accordingly, it is possible to prevent occurrence of blot failure due to the foreign matter caused by strong shock or the like.

According to the configuration of the camera module 50, the first lens group 1 is fixed to the focus movable portion and the second lens group 2 is fixed to the focus fixed portion. Thus, the first lens group 1 is able to be fixed to the focus movable portion after the second lens group 2 is fixed to the focus fixed portion. Accordingly, as described below, the first lens group 1 is able to be fixed to the focus movable portion after executing optical active alignment. As a result, it is possible to prevent occurrence of a positional shift and a shift in the optical axes caused between the first lens group 1 and the second lens group 2.

Further, a similar effect is expected also when the second lens group 2 is fixed to the focus fixed portion after the first lens group 1 is fixed to the focus movable portion.

In addition, the actuator 20A in which the positions of the first lens group 1 and the second lens group 2 are adjusted is fixed to the substrate 9. Therefore, as described below, the actuator 20A is able to be fixed to the substrate 9 after executing electric active alignment. As a result, it is possible to prevent occurrence of a positional shift and a shift in the optical axes caused between the sensor chip 10 (imaging sensor) mounted on the substrate 9, and the first lens group 1 and the second lens group 2 (combined lens group 22). The description thereof will be given in detail below.

(Manufacturing Method of Camera Module 50)

Figure 4:
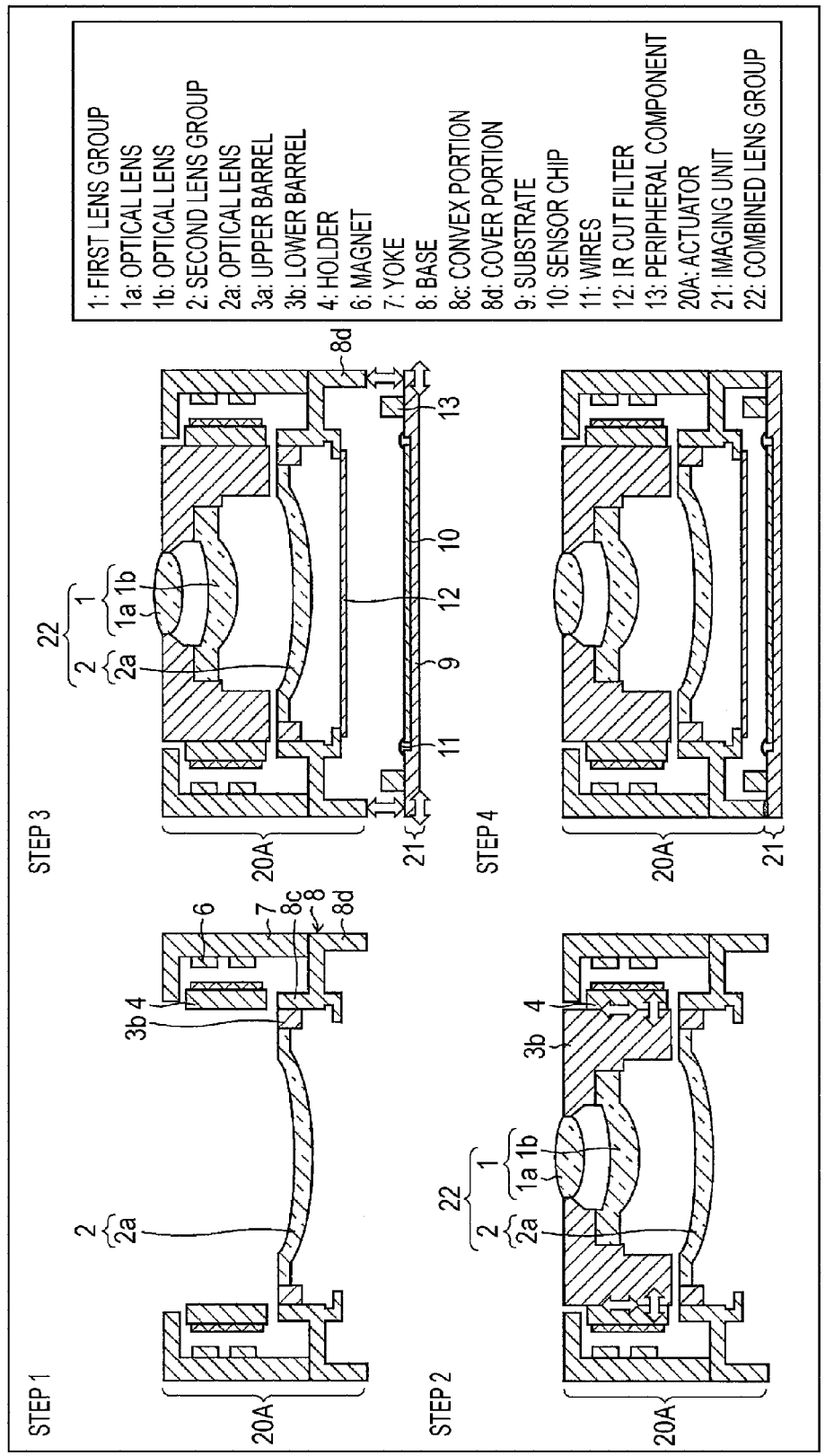
FIG. 4 is a view for explaining producing steps of the camera module in Embodiment 1 of the invention.

Next, as a manufacturing method of the camera module 50, a method for assembling the first lens group 1, the second lens group 2, the barrel 3, the actuator 20A, and the imaging unit 21 which are components of the camera module 50 will be described with reference to FIG. 4. FIG. 4 is a view for explaining producing steps of the camera module 50 in Embodiment 1 of the invention. Note that, description for a method for manufacturing each of the aforementioned components of the camera module 50 will be omitted.

At a step 1 (second lens group fixing step), the second lens group 2 formed of the optical lens 2a is fixed to the lower barrel 3b. The second lens group 2 and the lower barrel 3b are fixed with, for example, an adhesive. In addition, the lower barrel 3b is fixed to the base 8 with an adhesive (not illustrated). At this time, the lower barrel 3b is fixed at a predetermined position on the inner side of the convex portion 8c of the base 8. The predetermined position is determined by adjusting the height with a jig or the like in advance. Thereby, together with the lower barrel 3b, the second lens group 2 is fixed to the base 8 of the actuator 20A.

At a step 2, the first lens group 1 formed of the optical lens 1a and the optical lens 1b is fixed to the upper barrel 3a. The first lens group 1 and the upper barrel 3a are fixed with, for example, an adhesive. In addition, the upper barrel 3a is fixed to the holder 4 with an adhesive (not illustrated) (first lens group fixing step). At this time, the upper barrel 3a is fixed to the holder 4 after adjusting a fixation position. The adjustment of the fixation position will be described below.

At the step 2, in order to adjust the fixation position, optical active alignment in which an image of a resolution pattern or the like is optically formed by the first lens group 1 and the second lens group 2, data of the formed image is fed back, and fine adjustment of the fixation position of the upper barrel 3a at the holder 4 is performed to an optimum position is executed. The optical active alignment is the fine adjustment of the position of the upper barrel 3a in the holder 4 and includes fine adjustment of not only a vertical direction but also a tilt (first lens group adjusting step).

Specifically, for example, with the second lens group 2 fixed to the base 8 of the actuator 20A and the first lens group 1 fixed to the upper barrel 3a which is provisionally arranged above the second lens group 2, the image of the resolution pattern is formed.

Based on a result of the image formation, a position and an angle of the first lens group 1 are adjusted so that the position of the image formation does not change even when the first lens group 1 is displaced. This adjustment is repeated until the position of the image formation becomes unchanged.

In other words, at the step 2, when the upper barrel 3a to which the first lens group 1 is fixed is fixed to the holder 4, the image formed by the first lens group 1 and the second lens group 2 is fed back and adjustment of the optical axis of the first lens group 1 and adjustment of a distance between the first lens group 1 and the second lens group 2 are performed.

At a step 3, the actuator 20A in which the first lens group 1 and the second lens group 2 are fixed at the optimal positions is fixed with an adhesive to the imaging unit 21 to which the substrate 9, the sensor chip 10, the wires 11, the IR cut filter 12, and the peripheral component 13 have been already fixed (focus adjustment mechanism fixing step). At this time, the actuator 20A is fixed to the imaging unit 21 after the fixation position thereof is adjusted. In other words, the combined lens group 22 formed of the first lens group 1 and the second lens group 2 is fixed to the sensor chip 10 after the fixation position thereof is adjusted. The adjustment of the fixation position will be described below.

Performed at the step 3 is electric active alignment in which with data of an image formed from an electric image formed by the first lens group 1 and the second lens group 2, that is, the combined lens group 22, and the sensor chip 10, fine adjustment of the fixation position of the actuator 20A at the imaging unit 21 is performed to an optimum position (focus adjustment mechanism adjusting step).

Specifically, for example, the image of the resolution pattern is formed by the combined lens group 22 and the sensor chip 10, and a reference image and the resultant formed image are compared. Based on the comparison, a position and an angle of the actuator 20A with respect to the imaging unit 21 are adjusted so that a difference between the reference image and the formed image is eliminated. This adjustment is repeated until the difference between the reference image and the formed image is eliminated. After the adjustment, the actuator 20A is fixed to the imaging unit 21. More specifically, the cover portion 8d of the base 8 is fixed to the substrate 9 with an adhesive.

In other words, at the step 3, when the actuator 20A is fixed to the substrate 9, the image formed by the combined lens group 22 and the sensor chip 10 is fed back, and adjustment of the optical axis of the combined lens group 22 and adjustment of a distance between the combined lens group 22 and the sensor chip 10 are performed. Note that, the analysis prescribed above is set as appropriate.

At a step 4, after the actuator 20A and the imaging unit 21 are fixed at the step 3, predetermined tests such as an imaging test are performed and the camera module 50 is completed.

With the aforementioned manufacturing method, when the upper barrel 3a to which the first lens group 1 is fixed is fixed to the holder 4, the upper barrel 3a is able to be fixed to the holder 4 after the position and the angle of the first lens group 1 with respect to the second lens group 2 are adjusted. Accordingly, it is possible to prevent occurrence of a positional shift and a shift in the optical axes caused between the first lens group 1 and the second lens group 2.

The actuator 20A is able to be fixed to the imaging unit 21 after the position and the angle of the combined lens group 22 with respect to the sensor chip 10 are adjusted. Accordingly, it is possible to prevent occurrence of a positional shift and a shift in the optical axes caused between the combined lens group 22 and the sensor chip 10.

As a result, it is possible to position the first lens group 1 and the second lens group 2 accurately and further possible to position the first lens group 1, the second lens group 2 (combined lens group 22), and the sensor chip 10 (imaging sensor) accurately. Thus, it is possible to prevent shading and partial blur of the camera module 50.

Further, since there is neither a positional shift nor a shift in the optical axes between the combined lens group 22 and the sensor chip 10, there is neither a positional shift nor a shift in the optical axes between the second lens group 2 and the sensor chip 10 as well. Thus, even when the second lens group 2 has a function to correct distortion aberration or incident light, the function is able to be realized successfully.

The similar steps are performed also when the second lens group 2 is fixed to the focus fixed portion after the first lens group 1 is fixed to the focus movable portion. In this case, the upper barrel 3a to which the first lens group 1 is fixed is fixed to the holder 4 at the step 1 (first lens group fixing step). The lower barrel 3b to which the second lens group 2 is fixed is fixed to the base 8 at the step 2 (second lens group fixing step). When the lower barrel 3b to which the second lens group 2 is fixed is fixed to the base 8, the optical active alignment in which the image formed by the first lens group 1 and the second lens group 2 is fed back to thereby adjust the position and the angle of the second lens group 2 is executed (second lens group adjustment step). Note that, the step 3 and the step 4 are the same as the step 3 and the step 4 described above.

[Embodiment 2]

Figure 5:
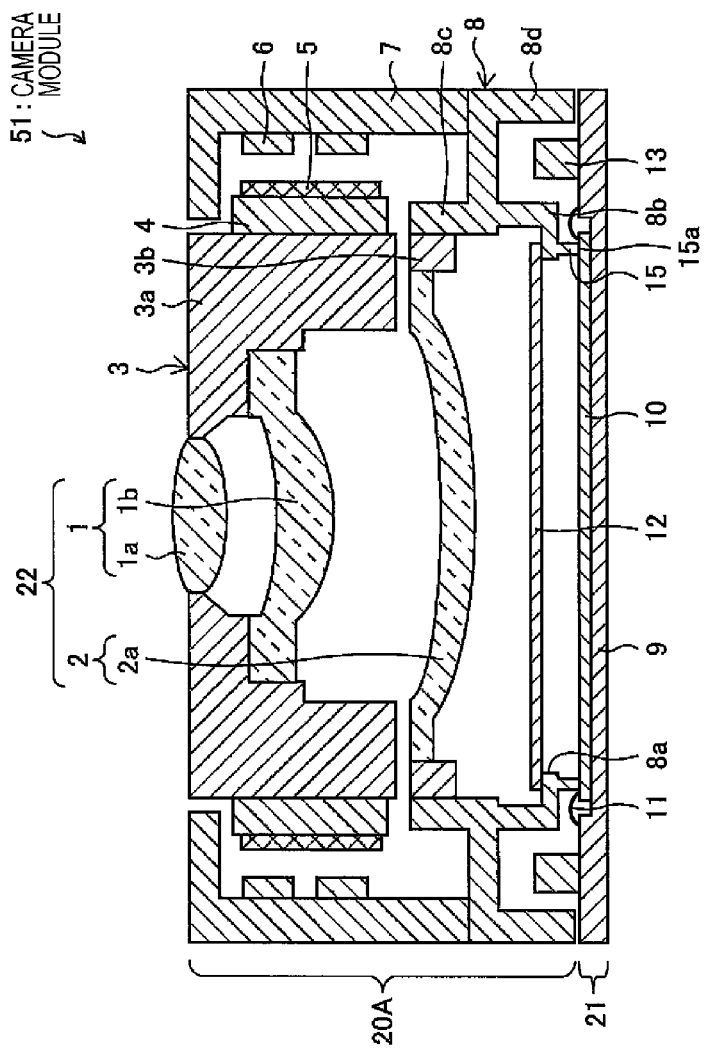
FIG. 5 is a vertical sectional view illustrating a configuration example of a main part of a camera module according to Embodiment 2 of the invention.

A camera module 51 according to Embodiment 2 of the invention will be described based on FIG. 5. Note that, for convenience of the description, the same reference signs will be assigned to the members having the same functions as the members described in Embodiment 1, and the description thereof will be omitted. FIG. 5 is a vertical sectional view illustrating a configuration example of a main part of the camera module 51.

The camera module 51 according to Embodiment 2 is different from the camera module 50 according to Embodiment 1 in following points.

In the camera module 50, by fixing the cover portion 8d of the base 8 to the substrate 9, the actuator 20A and the imaging unit 21 are fixed. At this time, the actuator 20A is fixed after a fixation position thereof at the imaging unit 21 is adjusted by the electric active alignment.

On the other hand, in the actuator 20A of the camera module 51, the base 8 further includes a chip abutting unit 15 (abutting unit), and by abutting the chip abutting unit 15 against the sensor chip 10, the actuator 20A and the imaging unit 21 are fixed.

With such a configuration, the actuator 20A and the imaging unit 21 are able to be fixed accurately without performing the electric active alignment at the step 3. Accordingly, the electric active alignment is able to be omitted in a process of manufacturing the camera module 51.

The description thereof will be given in detail below.

(Configuration of Camera Module 51)

As illustrated in FIG. 5, in the camera module 51, the base 8 has the chip abutting unit 15, which projects downward, at a part of a lower end surface of the convex portion 8b. The chip abutting unit 15 is formed in a quadrilateral around a light-receiving pixel area, on which light is incident, of the sensor chip 10 so as to avoid this area. The shape and number of chip abutting units 15 are not particularly limited. For example, the chip abutting unit 15 may be formed in a columnar shape, and the number thereof is preferably three or four, but may be multiple.

By abutting a lower end surface of the chip abutting unit 15, which serves as a reference surface on the bottom surface side of the base 8, against an upper surface of the sensor chip 10 without using an adhesive, it is possible to eliminate a tilt caused in manufacturing due to precision of an attachment device when the actuator 20A is attached to the substrate 9. That is, by butting the lower end surface of the chip abutting unit 15 against the upper surface of the sensor chip 10, positioning of the combined lens group 22 with respect to the sensor chip 10 in the optical axis direction is able to be performed accurately regardless of the attachment device.

Specifically, there is a gap caused by tolerance between the substrate 9 and the cover portion 8d of the base 8 in order to abut the chip abutting unit 15 against the sensor chip 10. After an adhesive (not illustrated) is filled in this gap, the chip abutting unit 15 is caused to abut against the sensor chip 10. Then, the adhesive is cured by applying heat or the like and the base 8 and the substrate 9 are fixed. During the time, the chip abutting unit 15 is kept on abutting against the sensor chip 10.

With such a configuration, it is possible to improve the tilt of the actuator 20A with the sensor chip 10, caused in manufacturing. Thus, it is possible to reduce a positional shift and a shift in the optical axes between the combined lens group 22 and the sensor chip 10 without performing the electric active alignment, resulting that it is possible to significantly improve partial blur or the like.

[Embodiment 3]

Figure 6:
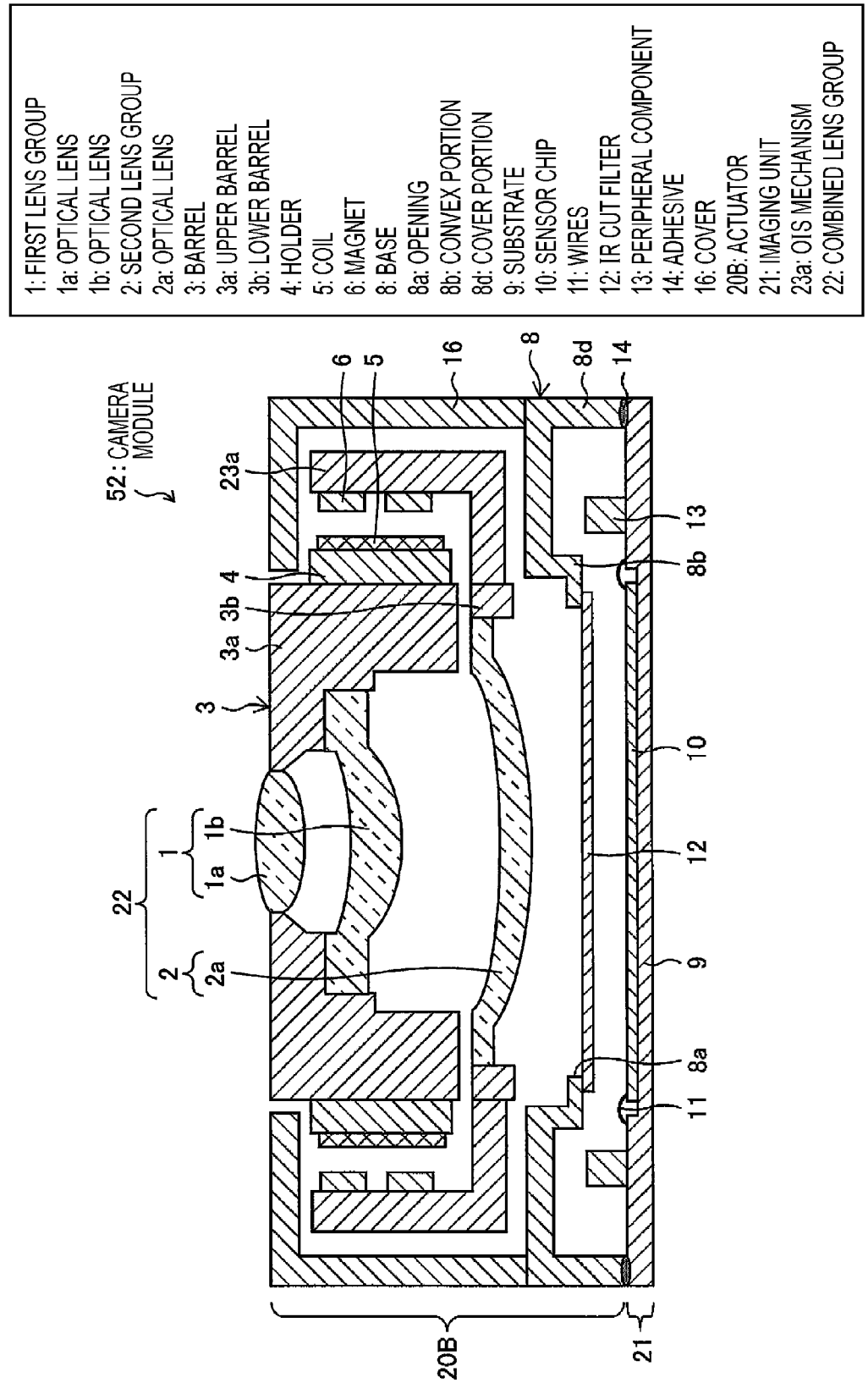
FIG. 6 is a vertical sectional view illustrating a configuration example of a main part of a camera module according to Embodiment 3 of the invention.

A camera module 52 according to Embodiment 3 of the invention will be described based on FIG. 6. Note that, for convenience of the description, the same reference signs will be assigned to the members having the same functions as the members described in Embodiment 1, and the description thereof will be omitted. FIG. 6 is a vertical sectional view illustrating a configuration example of a main part of the camera module 52.

The camera module 52 according to Embodiment 3 is different from the camera module 50 according to Embodiment 1 in following points.

The camera module 50 has the AF function. The lower barrel 3b is fixed to the convex portion 8c of the base 8.

On the other hand, the camera module 52 further has a function of optical image stabilizer (OIS). Specifically, the camera module 52 has an actuator 20B, and the actuator 20B has an OIS mechanism 23a. Further, the lower barrel 3b is fixed to the OIS mechanism 23a of the actuator 20B.

With such a configuration, it is possible to provide the camera module 52 having the AF and OIS functions in which shading and partial blur are suppressed. The description thereof will be given in detail below.

(Configuration of Camera Module 52)

As illustrated in FIG. 6, the camera module 52 includes the first lens group 1, the second lens group 2, the barrel 3, the actuator 20B, and the imaging unit 21. The first lens group 1, the second lens group 2, and the imaging unit 21 are configured in the same manner as those of the camera module 50. The barrel 3 and the actuator 20B are different from those of the camera module 50. The description thereof will be given below.

The barrel 3 includes the upper barrel 3a and the lower barrel 3b. The upper barrel 3a is the same as the upper barrel 3a of the camera module 50. The lower barrel 3b holds the second lens group 2 inside thereof. The lower barrel 3b is fixed to the OIS mechanism 23a of the actuator 20B described below.

The actuator 20B is a device for displacing the first lens group 1 in the optical axis direction during focusing, and displacing the first lens group 1 and the second lens group 2 (combined lens group 22) in the direction vertical to the optical axis during image stabilization.

Specifically, the actuator 20B includes the holder 4, the coil 5, the magnet 6, the cover 16, the base 8, and the OIS mechanism 23a.

The holder 4 is a ring member and holds the upper barrel 3a by the inner peripheral wall thereof. The holder 4 is supported so as to be able to be displaced in the optical axis direction with respect to the OIS mechanism 23a described below. A method for supporting the holder 4 is not particularly limited. For example, by using a spring configured so that a spring constant in the direction vertical to the optical axis direction is significantly great in comparison with a spring constant in the optical axis direction, the upper end and the lower end of the holder 4 may be fixed to the OIS mechanism 23a.

The cover 16 is formed in a shape surrounding the holder 4 and the OIS mechanism 23a. A coil for OIS (not illustrated) is fixed to an inner peripheral wall of the cover 16. An axial core of the coil for OIS is vertical to the optical axes of the first lens group 1 and the second lens group 2.

The coil 5 is wounded and fixed on an outer peripheral wall of the holder 4.

The magnet 6 is fixed to an inner peripheral wall of the OIS mechanism 23a at a predetermined gap with the coil 5.

By flowing current through the coil 5, electromagnetic force is generated between the coil 5 and the magnet 6. When the electromagnetic force acts on the holder 4, the holder 4 is displaced in the optical axis direction together with the upper barrel 3a and the first lens group 1. That is, by flowing the current through the coil 5, the first lens group 1 is able to be displaced in the optical axis direction.

Differently from the camera module 50, the base 8 does not have the convex portion 8c and the lower barrel 3b is not fixed to the base 8. The lower barrel 3b is fixed to the OIS mechanism 23a described below.

The OIS mechanism 23a is, for example, a member whose top and bottom ends are open and which is formed of only a bottom surface and side surfaces, and is arranged to be surrounded by the holder 4, the cover 16, and the base 8. The magnet 6 is fixed to the inner peripheral wall of the OIS mechanism 23a. Further, to an outer peripheral wall of the OIS mechanism 23a, a magnet for OIS (not illustrated) is fixed so as to face the coil for OIS at a predetermined gap. In addition, the OIS mechanism 23a is supported so as to be able to be displaced in the direction vertical to the optical axis with respect to the base 8. Note that, a method for supporting the OIS mechanism 23a is not particularly limited. For example, the OIS mechanism 23a may be supported by using a suspension wire.

By flowing current through the coil for OIS, electromagnetic force is generated between the coil for OIS and the magnet for OIS. When the electromagnetic force acts on the OIS mechanism 23a, the OIS mechanism 23a is displaced in the direction vertical to the optical axis integrally with the lower barrel 3b, the second lens group 2, the holder 4, the upper barrel 3a, and the first lens group 1. That is, by flowing the current through the coil for OIS, the combined lens group 22 is able to be displaced in the direction vertical to the optical axis.

In the actuator 20B, only the holder 4 and the coil 5 are displaced in the optical axis direction during focusing, and the magnet 6, the cover 16, the base 8, and the OIS mechanism 23a are not displaced during focusing. That is, the holder 4 and the coil 5 function as a focus movable portion (movable portion) which is displaced during focusing, and the magnet 6, the cover 16, the base 8, and the OIS mechanism 23a function as a focus fixed portion (non-movable portion) which is not displaced during focusing.

Accordingly, the first lens group 1 fixed to the focus movable portion is displaced in the optical axis direction during focusing. On the other hand, the second lens group 2 fixed to the focus fixed portion is not displaced during focusing. As a result, the camera module 52 has a configuration in which only the first lens group 1 is displaced during focusing and therefore realizes the same effect as that of the camera module 50 according to Embodiment 1.

Moreover, in the actuator 20B, the holder 4, the coil 5, the magnet 6, and the OIS mechanism 23a are displaced during image stabilization and the cover 16 and the base 8 are not displaced during image stabilization. That is, the holder 4, the coil 5, the magnet 6, and the OIS mechanism 23a function as an OIS movable portion which is displaced during image stabilization, and the cover 16 and the base 8 function as an OIS fixed portion which is not displaced during image stabilization.

In other words, the OIS mechanism 23a (image stabilization mechanism) displaces the focus movable portion (movable portion) and the second lens group 2 in the direction vertical to the optical axis with respect to the base 8 and the cover 16.

Thus, the first lens group 1 and the second lens group 2, that is, the combined lens group 22, which is fixed to the OIS movable portion, is displaced in the direction vertical to the optical axis during image stabilization. Therefore, during image stabilization, the OIS mechanism 23a is displaced in the direction vertical to the optical axis integrally with the combined lens group 22 and performs image stabilization. Accordingly, the position of the second lens group 2 with respect to the first lens group 1 is not shifted during image stabilization. As a result, it is possible to perform image stabilization successfully while maintaining optimum distances between the first lens group 1 and the second lens group 2 and between the combined lens group 22 and the sensor chip 10, thus making it possible to provide the camera module 52 having the AF and OIS functions in which shading and partial blur are suppressed.

[Embodiment 4]

A camera module 53 according to Embodiment 4 of the invention will be described based on FIG. 7.

Note that, for convenience of the description, the same reference signs will be assigned to the members having the same functions as the members described in Embodiment 1, and the description thereof will be omitted. FIG. 7 is a vertical sectional view illustrating a configuration example of a main part of the camera module 53.

The camera module 53 according to Embodiment 4 is different from the camera module 50 according to Embodiment 1 in following points.

The camera module 50 has the AF function.

On the other hand, the camera module 53 further has the OIS function. The camera module 53 has an actuator 20C, and the actuator 20C includes an OIS mechanism 23b. Further, the lower barrel 3b is fixed to the base 8 of the actuator 20C.

With such a configuration, it is possible to provide the camera module 53 having the AF and OIS functions in which shading and partial blur are suppressed and power consumption during focusing and during image stabilization is suppressed. The description thereof will be given in detail below.

(Configuration of Camera Module 53)

Figure 7:
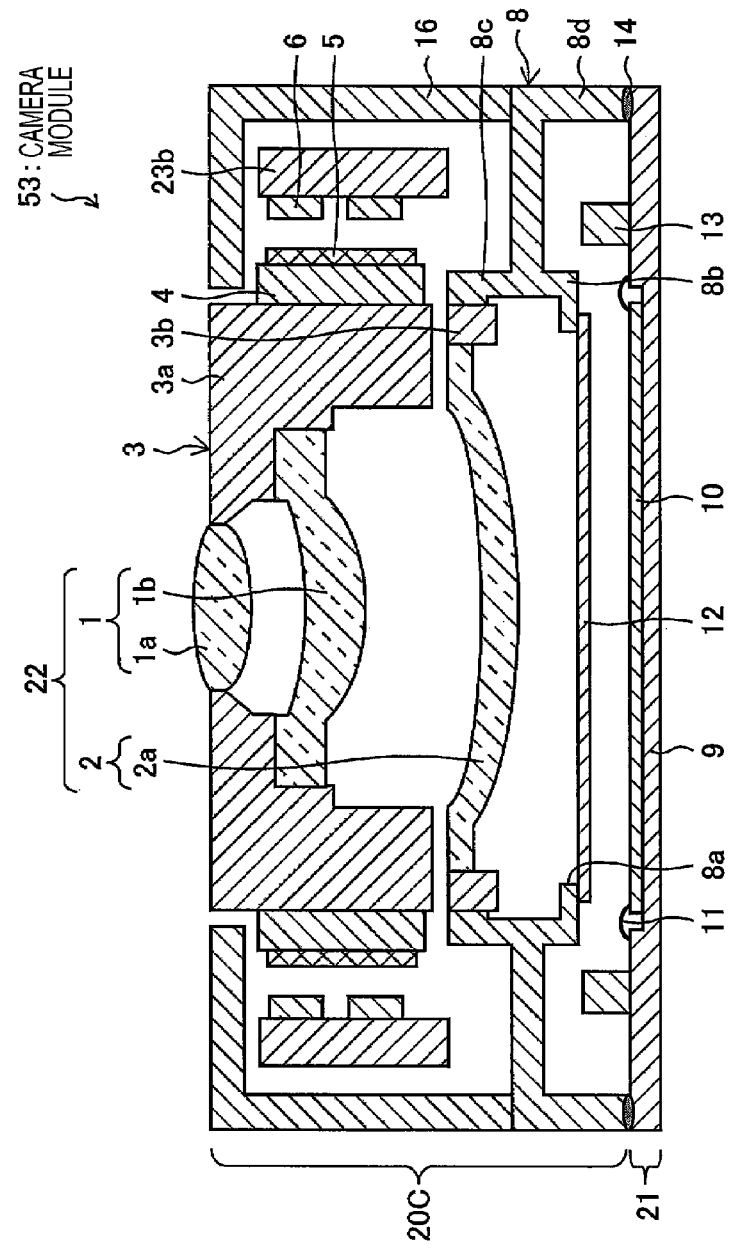
FIG. 7 is a vertical sectional view illustrating a configuration example of a main part of a camera module according to Embodiment 4 of the invention.

As illustrated in FIG. 7, the camera module 53 includes the first lens group 1, the second lens group 2, the barrel 3, the actuator 20C, and the imaging unit 21. The first lens group 1, the second lens group 2, the barrel 3, and the imaging unit 21 are configured in the same manner as those of the camera module 50. The actuator 20C is different from that of Embodiment 1. The description thereof will be given below.

The actuator 20C is a device for displacing the first lens group 1 in the optical axis direction during focusing, and displacing the first lens group 1 in the direction vertical to the optical axis during image stabilization.

Specifically, the actuator 20C includes the holder 4, the coil 5, the magnet 6, the cover 16, the base 8, and the OIS mechanism 23b.

The holder 4 is a ring member and holds the upper barrel 3a by the inner peripheral wall thereof. The holder 4 is supported so as to be able to be displaced in the optical axis direction with respect to the OIS mechanism 23b described below. A method for supporting the holder 4 is not particularly limited. For example, by using a spring configured so that a spring constant in the direction vertical to the optical axis direction is significantly great in comparison with a spring constant in the optical axis direction, the upper end and the lower end of the holder 4 may be fixed to the OIS mechanism 23b.

The cover 16 is formed in a shape surrounding the holder 4. The coil for OIS (not illustrated) is fixed to the inner peripheral wall of the cover 16. The axial core of the coil for OIS is vertical to the optical axes of the first lens group 1 and the second lens group 2.

The coil 5 is wounded and fixed on the outer periphery of the holder 4.

The magnet 6 is fixed to an inner peripheral wall of the OIS mechanism 23b at a predetermined gap with the coil 5.

By flowing current through the coil 5, electromagnetic force is generated between the coil 5 and the magnet 6. Thus, when the electromagnetic force acts on the holder 4, the holder 4 is displaced in the optical axis direction together with the upper barrel 3a and the first lens group 1. That is, by flowing the current through the coil 5, the first lens group 1 is able to be displaced in the optical axis direction.

The base 8 is configured in the same manner as that of the camera module 50.

The OIS mechanism 23b is, for example, a hollow member whose top and bottom ends are open, and is arranged to be surrounded by the holder 4, the cover 16, and the base 8. The magnet 6 is fixed to the inner peripheral wall of the OIS mechanism 23b. Further, to an outer peripheral wall of the OIS mechanism 23b, a magnet for OIS (not illustrated) is fixed so as to face the coil for OIS at a predetermined gap. In addition, the OIS mechanism 23b is supported so as to be able to be displaced in the direction vertical to the optical axis with respect to the base 8. Note that, a method for supporting the OIS mechanism 23b is not particularly limited. For example, the OIS mechanism 23b may be supported by using a suspension wire.

By flowing current through the coil for OIS, electromagnetic force is generated between the coil for OIS and the magnet for OIS. When the electromagnetic force acts on the OIS mechanism 23b, the OIS mechanism 23b is displaced in the direction vertical to the optical axis integrally with the holder 4, the upper barrel 3a, and the first lens group 1. That is, by flowing the current through the coil for OIS, the first lens group 1 is able to be displaced in the direction vertical to the optical axis.

In the actuator 20C, only the holder 4 and the coil 5 are displaced in the optical axis direction during focusing, and the magnet 6, the cover 16, the base 8, and the OIS mechanism 23b are not displaced during focusing. That is, the holder 4 and the coil 5 function as a focus movable portion (movable portion) which is displaced in the optical axis direction during focusing, and the magnet 6, the cover 16, the base 8, and the OIS mechanism 23b function as a focus fixed portion (non-movable portion) which is not displaced during focusing.

Accordingly, the first lens group 1 fixed to the focus movable portion is displaced in the optical axis direction during focusing. On the other hand, the second lens group 2 fixed to the focus fixed portion is not displaced during focusing. As a result, the camera module 53 has a configuration in which only the first lens group 1 is displaced during focusing and therefore realizes the same effect as that of the camera module 50 of Embodiment 1.

Moreover, in the actuator 20C, the holder 4, the coil 5, the magnet 6, and the OIS mechanism 23b are displaced in the direction vertical to the optical axis during image stabilization and the cover 16 and the base 8 are not displaced during image stabilization. That is, the holder 4, the coil 5, the magnet 6, and the OIS mechanism 23b function as an OIS movable portion which is displaced during image stabilization, and the cover 16 and the base 8 function as an OIS fixed portion which is not displaced during image stabilization.

In other words, the OIS mechanism 23b (image stabilization mechanism) displaces the focus movable portion (movable portion) in the direction vertical to the optical axis with respect to the base 8 and the cover 16.

Thus, during image stabilization, only the first lens group 1 fixed to the OIS movable portion is displaced in the direction vertical to the optical axis and the second lens group 2 fixed to the OIS fixed portion is not displaced. As a result, since weight of the OIS movable portion is reduced, it is possible to reduce power consumption during image stabilization.

Here, as described above, the second lens group 2 is not displaced integrally with the first lens group 1 during image stabilization in the camera module 53. Thus, the optical axis of the second lens group 2 which is not displaced in the direction vertical to the optical axis is shifted from the optical axis of the first lens group 1 which is displaced in the direction vertical to the optical axis due to image stabilization. As a result, defects may be caused in concentration of light and image quality is considered to be deteriorated.

Against the deterioration in image quality, the present embodiment adopts a lens having a great curvature for the second lens group 2 to thereby prevent the deterioration in image quality.

Specifically, by adopting, for the second lens group 2, a lens in which a stabilization amount by image stabilization is an absolute value of +/−0.1 mm or the like and which has a greater curvature than that of the first lens group 1, sensitivity of the second lens group 2 with respect to the shifting mount of the optical axes is reduced. This makes it possible to reduce influence of the shift between the optical axes of the first lens group 1 and the second lens group 2. Note that, though setting of the curvature of the second lens group 2 is not particularly limited, for example, it may be set that a whole of the first lens group 1 has a lens design having negative power (concave lens), and by increasing the power as much as possible, that is, by decreasing the curvature as much as possible, the curvature of the second lens group 2 is set to be greater than the curvature of the first lens group 1.

Accordingly, the aforementioned configuration makes it possible to prevent the deterioration in image quality when a shift of the optical axes is generated between the first lens group 1 and the second lens group 2 during image stabilization. In addition, by not displacing the second lens group 2 during focusing and during image stabilization, it is possible to reduce weight of the movable portion so that power consumption is able to be suppressed. As a result, it is possible to provide the camera module 53 having the AF and OIS functions in which shading and partial blur are suppressed and power consumption during focusing and during image stabilization is suppressed.

SUMMARY

An imaging module (camera module 50, 51, 52, 53) according to an aspect 1 of the invention is an imaging module including: a substrate (9) on which an imaging sensor (sensor chip 10) is mounted; a plurality of lenses (optical lenses 1*a*, 1*b*, 2*a*) for imaging light from an object on the imaging sensor; and a focus adjustment mechanism (actuator 20A, 20B, 20C) which adjusts focus of the plurality of lenses and is fixed to the substrate, in which the focus adjustment mechanism includes a movable portion (holder 4, coil 5) which is displaced in an optical axis direction of the plurality of lenses and a non-movable portion (magnet 6, yoke 7, base 8, OIS mechanism 23*a*, OIS mechanism 24*b*) which is not displaced in the optical axis direction, a first lens group (1) formed of two or more lenses selected from the plurality of lenses is fixed to an inner peripheral wall of the movable portion, and a second lens group (2) formed of one or more lenses not included in the first lens group and selected from the plurality of lenses is fixed to an inner peripheral wall of the non-movable portion.

According to the aforementioned configuration, the first lens group is fixed to the movable portion and the second lens group is fixed to the non-movable portion which is not displaced in the optical axis direction of the focus adjustment mechanism. Thus, the first lens group is able to be fixed to the movable portion after the second lens group is fixed to the non-movable portion. Therefore, the first lens group is able to be fixed to the movable portion after optical active alignment is executed. Accordingly, it is possible to prevent occurrence of a positional shift and a shift in optical axes caused between the first lens group and the second lens group.

The focus adjustment mechanism in which positions of the first lens group and the second lens group are adjusted is fixed to the substrate. Thus, the focus adjustment mechanism is able to be fixed to the substrate after electric active alignment is executed. Accordingly, it is possible to prevent occurrence of a positional shift and a shift in the optical axes caused between the imaging sensor mounted on the substrate, and the first lens group and the second lens group.

As a result, it is possible to position the first lens group and the second lens group accurately and further to position the first lens group, the second lens group, and the imaging sensor accurately. Since lenses and the imaging sensor are able to be positioned accurately, it is possible to prevent shading and partial blur in the camera module.

According to the aforementioned configuration, the first lens group is fixed to the movable portion which is displaced in the optical axis direction and the second lens group is fixed to the non-movable portion which is not displaced in the optical axis direction. Thus, it is possible to reduce weight of the camera module during focusing. As a result, a moving tilt caused in the focus adjustment mechanism is suppressed and deterioration in image quality such as partial blur is improved. It is also possible to reduce power consumption during focusing.

In the imaging module (camera module 50, 51, 52, 53) according to an aspect 2 of the invention, in the aspect 1, the second lens group (2) may be arranged between the first lens group (1) and the imaging sensor (sensor chip 10), and an angle formed by light incident from the first lens group on the second lens group and the optical axis may be greater than an angle formed by light output from the second lens group to the imaging sensor and the optical axis.

According to the aforementioned configuration, the second lens group is arranged between the first lens group and the imaging sensor. Therefore, it is possible to prevent occurrence of blot failure due to a foreign matter caused by strong shock or the like.

Moreover, according to the aforementioned configuration, the angle formed by light incident from the first lens group on the second lens group and the optical axis is greater than the angle formed by light output from the second lens group to the imaging sensor and the optical axis. Thus, it is possible to reduce a stroke during focusing in the imaging module. As a result, the following effects are realized. (1) Since an image obtained from an object is able to be formed on an imaging surface with a small stroke amount, efficient focusing is able to be performed. (2) A moving tilt caused in the focus adjustment mechanism is suppressed and deterioration in image quality such as partial blur is improved. (3) Relatively excellent image quality of an image obtained in the case of macro is maintained. (4) Height of the imaging module is able to be reduced by the reduced stroke amount. (5) It is possible to reduce power consumption during focusing.

In the imaging module (camera module 51) according to an aspect 3 of the invention, in the aspect 1 or 2, the focus adjustment mechanism (actuator 20A) may further include an abutting unit abutting against a surface of the imaging sensor (sensor chip 10).

According to the aforementioned configuration, the abutting unit of the focus adjustment mechanism abuts against the imaging sensor. Thus, it is possible to fix the focus adjustment mechanism and imaging sensor accurately without executing electric active alignment.

In the imaging module (camera module 52) according to an aspect 4 of the invention, in any of the aspects 1 to 3, an image stabilization mechanism (OIS mechanism 23*a*) for displacing the movable portion (holder 4, coil 5) and the second lens group (2) in the direction vertical to the optical axis may be included.

According to the aforementioned configuration, the movable portion to which the first lens group is fixed is displaced in the direction vertical to the optical axis with the second lens group during image stabilization. Thus, the first lens group and the second lens group are displaced integrally during image stabilization, so that the optical axes of the first lens group and the second lens group are not shifted. As a result, it is possible to provide a camera module with a focus function and an image stabilization mechanism in which shading and partial blur are suppressed.

In the imaging module (camera module 53) according to an aspect 5 of the invention, in any of the aspects 1 to 3, an image stabilization mechanism (OIS mechanism 23*b*) for displacing the movable portion (holder 4, coil 5) in the direction vertical to the optical axis may be further included, and the lens of the second lens group (2) may have a greater curvature than that of the lenses of the first lens group (1).

According to the aforementioned configuration, the movable portion to which the first lens group is fixed is displaced in the direction vertical to the optical axis during image stabilization. Thus, only the first lens group is displaced during focusing and during image stabilization, thus making it possible to reduce weight of a portion movable during focusing and during image stabilization. As a result, it is possible to suppress power consumption during focusing and during image stabilization.

A manufacturing method of the imaging module (camera module 50, 51, 52, 53) according to an aspect 6 of the invention is a manufacturing method of an imaging module for manufacturing the imaging module according any one of the aspects 1 to 5, which may include: a second lens group fixing step (step 1) of fixing the second lens group (2) to the inner peripheral wall of the non-movable portion (magnet 6, yoke 7, base 8, OIS mechanism 23*a*, OIS mechanism 24*b*); a first lens group adjusting step of executing active alignment (optical active alignment) for adjusting a position and an angle at which the first lens group (1) is fixed to the inner peripheral wall of the movable portion (holder 4, coil 5) by performing feedback of data of an image formed on the imaging sensor (sensor chip 10) by the first lens group and the second lens group; and a first lens group fixing step (step 2) of fixing the first lens group at the angle and at the position on the inner peripheral wall of the movable portion.

According to the aforementioned configuration, when the first lens group is fixed to the movable portions after the second lens group is fixed to the non-movable portion, the fixation is able to be performed after executing the optical active alignment. Thus, it is possible to prevent occurrence of a positional shift and a shift in the optical axes caused between the first lens group and the second lens group.

As a result, it is possible to position the first lens group and the second lens group accurately.

A manufacturing method of the imaging module (camera module 50, 51, 52, 53) according to an aspect 7 of the invention is a manufacturing method of an imaging module for manufacturing the imaging module according any one of the aspects 1 to 5, which may include: a focus adjustment mechanism adjusting step of executing active alignment (electric active alignment) for adjusting a position and an angle at which the focus adjustment mechanism (actuator 20A, 20B, 20C) is fixed to the substrate (9) by performing feedback of data of an image formed by the first lens group (1) and the second lens group (2); and a focus adjustment mechanism fixing step (step 3) of fixing the focus adjustment mechanism at the position and the angle in the substrate.

According to the aforementioned configuration, when the focus adjustment mechanism is fixed to the substrate, the fixation is able to be performed after executing the electric active alignment. Thus, it is possible to prevent occurrence of a positional shift and a shift in the optical axes caused between the imaging sensor mounted on the substrate, and the first lens group and the second lens group.

As a result, it is possible to position the first lens group, the second lens group, and the imaging sensor accurately.

A manufacturing method of the imaging module (camera module 50, 51, 52, 53) according to an aspect 8 of the invention is a manufacturing method of an imaging module for manufacturing the imaging module according to any one of the aspects 1 to 5, which may include: a first lens group fixing step (step 1) of fixing the first lens group (1) to the inner peripheral wall of the movable portion (holder 4, coil 5); a second lens group adjusting step of executing active alignment (optical active alignment) for adjusting a position and an angle at which the second lens group (2) is fixed to the inner peripheral wall of the non-movable portion (magnet 6, yoke 7, base 8, OIS mechanism 23*a*, OIS mechanism 24*b*) by performing feedback of data of an image formed on the imaging sensor (sensor chip 10) by the first lens group and the second lens group; and a second lens group fixing step (step 2) of fixing the second lens group at the angle and at the position on the inner peripheral wall of the non-movable portion.

According to the aforementioned configuration, when the second lens group is fixed to the non-movable portion after the first lens group is fixed to the movable portion, the fixation is able to be performed after executing the optical active alignment. Thus, it is possible to prevent occurrence of a positional shift and a shift in the optical axes caused between the first lens group and the second lens group.

The invention is not limited to each of the embodiments described above, and may be modified in various manners within the scope of the claims and an embodiment achieved by appropriately combining technical means disclosed in each of different embodiments is also encompassed in the technical scope of the invention. Further, by combining the technical means disclosed in each of the embodiments, a new technical feature may be formed.

INDUSTRIAL APPLICABILITY

The invention is able to be widely applied in a field of using a solid-state imaging device and imaging equipment including the same. Specifically, the invention is able to be used for achieving reduction in a size, improvement in image quality, reduction in power consumption for a small-sized imaging module requiring focus adjustment, which is used for mobile device such as a mobile phone or mobile terminal (PDA) with a camera.

REFERENCE SIGNS LIST

1 first lens group
1*a*, 1*b* optical lens (lens)
2 second lens group
2*a* optical lens (lens)
3 barrel
3*a* upper barrel 3b lower barrel
4 holder (movable portion)
5 coil (movable portion)
6 magnet (non-movable portion)
7 yoke (non-movable portion)
8 base (non-movable portion)
8b, 8c convex portion
8d cover portion
9 substrate
10 sensor chip (imaging sensor)
15 chip abutting unit (abutting unit)
16 cover (non-movable portion)
20A, 20B, 20C actuator (focus adjustment mechanism)
21 imaging unit
22 combined lens group
23a OIS mechanism (image stabilization mechanism, non-movable portion)
23b OIS mechanism (image stabilization mechanism, non-movable portion)
50, 51, 52, 53 camera module.

The invention claimed is:

1. An imaging module, comprising:
a substrate on which an imaging sensor is mounted;
a plurality of lenses for imaging light from an object on the imaging sensor; and
a focus adjustment mechanism which adjusts focus of the plurality of lenses and is fixed to the substrate, wherein
the focus adjustment mechanism includes a movable portion which is displaced in an optical axis direction of the plurality of lenses and a non-movable portion which is not displaced in the optical axis direction,
a first lens group formed of two or more lenses selected from the plurality of lenses is fixed to an inner peripheral wall of the movable portion, and a second lens group formed of one or more lenses not included in the first lens group and selected from the plurality of lenses is fixed to an inner peripheral wall of the non-movable portion,
the second lens group is arranged between the first lens group and the imaging sensor, and
an angle formed by light incident from the first lens group on the second lens group and the optical axis is greater than an angle formed by the light incident from the first lens group on the second lens group and output from the second lens group to the imaging sensor and the optical axis.

2. The imaging module according to claim 1, wherein the focus adjustment mechanism further includes an abutting unit abutting against a surface of the imaging sensor.

3. A manufacturing method of an imaging module for manufacturing the imaging module according to claim 1, comprising:
a second lens group fixing step of fixing the second lens group to the inner peripheral wall of the non-movable portion;
a first lens group adjusting step of executing active alignment for adjusting a position and an angle at which the first lens group is fixed to the inner peripheral wall of the movable portion by performing feedback of data of an image formed on the imaging sensor by the first lens group and the second lens group; and
a first lens group fixing step of fixing the first lens group at the angle and at the position on the inner peripheral wall of the movable portion.

4. A manufacturing method of an imaging module for manufacturing the imaging module according to claim 1, comprising:
a focus adjustment mechanism adjusting step of executing active alignment for adjusting a position and an angle at which the focus adjustment mechanism is fixed to the substrate by performing feedback of data of an image formed by the first lens group and the second lens group; and
a focus adjustment mechanism fixing step of fixing the focus adjustment mechanism at the position and the angle in the substrate.

5. A manufacturing method of an imaging module for manufacturing the imaging module according to claim 1, comprising:
a first lens group fixing step of fixing the first lens group to the inner peripheral wall of the movable portion;
a second lens group adjusting step of executing active alignment for adjusting a position and an angle at which the second lens group is fixed to the inner peripheral wall of the non-movable portion by performing feedback of data of an image formed on the imaging sensor by the first lens group and the second lens group; and
a second lens group fixing step of fixing the second lens group at the angle and at the position on the inner peripheral wall of the non-movable portion.

* * * * *